US011810275B2

(12) United States Patent
Dolgin et al.

(10) Patent No.: US 11,810,275 B2
(45) Date of Patent: Nov. 7, 2023

(54) TEMPORAL FILTERING RESTART FOR IMPROVED SCENE INTEGRITY

(71) Applicant: QUALCOMM Incorporated, San Diego, CA (US)

(72) Inventors: Yuri Dolgin, Haifa (IL); Costia Parfenyev, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 271 days.

(21) Appl. No.: 17/353,506

(22) Filed: Jun. 21, 2021

(65) Prior Publication Data

US 2022/0405898 A1 Dec. 22, 2022

(51) Int. Cl.
*G06T 5/10* (2006.01)
*G06T 7/246* (2017.01)
*G06T 5/50* (2006.01)

(52) U.S. Cl.
CPC .............. *G06T 5/10* (2013.01); *G06T 5/50* (2013.01); *G06T 7/248* (2017.01); *G06T 2207/20076* (2013.01); *G06T 2207/20212* (2013.01)

(58) Field of Classification Search
CPC .. G06T 5/10; G06T 5/50; G06T 7/248; G06T 2207/20076; G06T 2207/20212; G06T 2207/20182; G06T 5/002
(Continued)

(56) References Cited

U.S. PATENT DOCUMENTS

2011/0019093 A1* 1/2011 Zhong ..................... G06T 5/003
348/607
2011/0075035 A1* 3/2011 MacInnis ................ G06T 5/002
348/584
(Continued)

FOREIGN PATENT DOCUMENTS

CA           3036922 A1 *  4/2018  ........... G06T 3/4015
CN         101175151 B  *  7/2012  ............. G06T 5/002
WO    WO-2022050949 A1 *  3/2022

OTHER PUBLICATIONS

Dimoulas C.A., et al., "Joint Wavelet Video Denoising and Motion Activity Detection in Multimodal Human Activity Analysis: Application to Video-Assisted Bioacoustics/Psychophysiological Monitoring", Eurasia Journal on Advances in Signal Processing, vol. 12, No. 1&ndash,3, Oct. 31, 2007, p. 685, XP055209736, 19 Pages, Abstract Sections "2. Problem Definition", "3.2. Video Motion Detection Overview", "4.1. Video Denoising by Means of Spatiotemporal Wavelet Filtering (VD-STWF)", "4.2. Dynamic Background-Foreground Segmentation for Video Motion Activity Analysis", "5. Experimental Results and Discussion".
International Search Report and Written Opinion—PCT/US2022/072852—ISA/EPO—dated Sep. 22, 2022 (2102393WO).
(Continued)

*Primary Examiner* — Matthew C Bella
*Assistant Examiner* — Pardis Sohraby
(74) *Attorney, Agent, or Firm* — QUALCOMM Incorporated

(57) ABSTRACT

Temporal filtering operations may be reset for certain pixels within an image frame to reduce contribution from previous input frames to reduce ghosting and other artifacts. The resetting reduces the contribution to, for example, zero, either immediately or within a predetermined period of time (e.g., a certain number of frames). A decision regarding whether to reset temporal filtering for a pixel of the image frame may be based on a probability assigned to that pixel. The probability can be based on rules with one or more
(Continued)

criteria. One example factor for adjusting probability is a confidence level regarding the temporal filtering decision for the pixel, in which the probability for a random reset of a pixel is based on the confidence level regarding the temporal filtering decision for those pixels.

32 Claims, 5 Drawing Sheets

(58) Field of Classification Search
USPC .......................................................... 382/100
See application file for complete search history.

(56) References Cited

U.S. PATENT DOCUMENTS

| | | | |
|---|---|---|---|
| 2012/0207218 A1* | 8/2012 | Asamura | H04N 19/117 |
| | | | 375/E7.125 |
| 2020/0027202 A1* | 1/2020 | Oh | G06T 1/20 |
| 2022/0189109 A1* | 6/2022 | Panteleev | G06T 15/506 |

OTHER PUBLICATIONS

Yang L., et al., "A Survey of Temporal Antialiasing Techniques", Computer Graphics Forum: Journal of the European Association for Computer Graphics, Wiley-Blackwell, Oxford, vol. 39, No. 2, Jul. 13, 2020, pp. 607-621, XP071545890, Figures 2,3 Sections "1. Introduction", "1.1. Algorithm Overview", "2. A Brief History of Temporal Antialiasing", "3.1. Jittering Samples", "3.2. Data Reprojection Between Frames", "3.3. Sample Accumulation", "4.1. History Rejection".

* cited by examiner

TEMPORAL FILTERING RESTART FOR IMPROVED SCENE INTEGRITY

FIELD OF THE DISCLOSURE

Aspects of the present disclosure relate generally to image processing. Some features of the disclosure may enable and provide improvements in the processing of images in computational photography.

BACKGROUND

Image capture devices, devices that can capture one or more digital images whether still image photos or sequences of images for videos, can be incorporated into a wide variety of devices. By way of example, image capture devices may comprise stand-alone digital cameras or digital video camcorders, camera-equipped wireless communication device handsets, such as mobile telephones, cellular or satellite radio telephones, personal digital assistants (PDAs), panels or tablets, gaming devices, computer devices such as webcams, video surveillance cameras, or other devices with digital imaging or video capabilities.

An image capture device, regardless of its form, has certain inherent limitations in the image quality of a captured image. A temporal filter can be applied to image frames captured by the image capture device to improve the image quality in certain circumstances, particularly in low light scenes. A temporal filter modifies at least one pixel value in an image frame based at least in part on a value for a pixel in a prior frame. The temporal filter uses information from two image frames captured at different times to obtain an output image frame that may be higher quality than a single image frame. However, there are problems associated with temporal filtering that can reduce the resulting image quality.

BRIEF SUMMARY OF SOME EXAMPLES

Temporal filtering can produce artifacts in filtered images under certain circumstances. For example, objects that move or disappear from the scene can remain in the temporally filtered image output for a long time due to the temporally filtered image being based on previous image frames that included the object. These lingering objects in the image may be referred to as "ghosts" due to the object appearing in the image despite the object having left the scene. Ghosts may also appear under other circumstances such as when temporally filtering low contrast (e.g., signal-to-noise ratio (SNR)<1) images. The effects of ghosting may be more pronounced when more aggressive temporal filtering is applied. Any of these temporal filtering artifacts results in scene integrity issues in the output image frame. More aggressive filtering uses image frames from a longer period of time, resulting in the ghost object appearing longer or more pronounced. More aggressive temporal filtering may be useful in low light circumstances where the associated longer time period can reduce noise in the low light scene.

One technique for improving temporal filtering according to certain embodiments of this disclosure is to reset the temporal filtering for certain pixels in the image frame to improve the image quality of the image generated by the temporal filtering process. Resetting the temporal filter may reduce the contribution from previous image frames in a temporal filter such that previous input frames have less impact on the output image frame. The resetting may reduce the contribution to, for example, zero, either immediately or within a predetermined period of time (e.g., a certain number of frames). The reset may reduce the appearance of ghosting artifacts in a photograph. decision regarding whether to reset temporal filtering for a pixel of the image frame may be based on a probability assigned to that pixel. The probability can be based on rules with one or more criteria. One example factor for adjusting probability is a confidence level regarding the temporal filtering decision for the pixel, in which the probability for a random reset of a pixel is based on the confidence level regarding the temporal filtering decision for that pixel.

Temporal filtering can be applied for some pixels in an image frame and not applied for other pixels in an image frame, and the amount of temporal filtering applied to certain pixels can also be varied during the temporal filtering. A decision regarding whether to apply temporal filtering to a certain pixel can be based on one or more rules, each with one or more criteria. The temporal filtering decision may be based on determining whether the pixel corresponds to a static region or a dynamic region of the image. A static region may be determined based on whether a temporal difference between image frames is below a certain threshold, in which the threshold may correspond to an expected temporal noise in the image frame. A confidence level can be determined regarding the temporal filtering decision, and that confidence level used to determine whether to reset a pixel during temporal filtering processing.

The pixel reset rate in the temporal filter may be based on the confidence level of the temporal filtering decision for that pixel. The rate of pixel resets may be reduced, or no resets performed, for a pixel in which a confidence level is high. The rate of pixel resets can also be adjusted proportionally with the confidence level. For example, no pixel resets may be performed in a region in which a confidence level for pixels in the region is above a high threshold, while a low rate of resets (e.g., 1 in 20 pixels) may be performed in a region in which a confidence level for pixels in the region is above a middle threshold, and while a normal rate of resets (e.g., 1 in 10 pixels) may be performed in a region in which a confidence level is below the middle threshold. The confidence level of a temporal filtering decision may be based on one or more criteria. For example, a high confidence level may be associated with having a sufficiently high signal-to-noise ratio (SNR) in a region of the image. In another example, a high confidence level may be associated with detecting a presence of a strong texture in a region of the image and, at the same time, a low temporal difference between the pixel in the image frames being input to the temporal filter. The pixel reset rate may be implemented using a reset weighting map indicating a probability of reset of a pixel and a random function modified by that probability to determine whether to reset or not reset an individual pixel for which temporal filtering is otherwise determined to be performed.

The temporal filtering described herein may be implemented by processing two or more image frames, either directly on the output of an image sensor or on a stored series of image frames. In some embodiments, one image frame is the current image frame referring to the image frame in a series of image frames that is currently being processed. In a real-time image capture device, the current image frame may be the most recent image frame captured by the image sensor. The temporal filtering may modify a pixel of the current image frame based on one or more previous image frames occurring earlier in the series of image frames, such as with an image frame captured earlier in time by the image sensor. In some embodiments, the temporal filter may be an Infinite Impulse Response (IIR) filter, which processes the current image frame using a previous image frame that is itself temporally filtered. IIR filters provide temporal filtering using lower bandwidth, lower computational resources, and less power. IIR filters may thus be beneficial in devices operating from limited power supplies such as batteries or in devices operating with reduced processing capabilities due to device mobility factors.

In some embodiments, temporal filtering may be applied to image frames without motion compensation applied prior to blending. In some embodiments, temporal filtering may be applied to image frames with motion compensation applied prior to blending with other frames in a temporal filter. In embodiments with motion compensation applied before temporal filtering, the blending of the image frames may be performed in static areas (e.g., areas in which the change in a pixel from the one image frame to another image frame is below a threshold amount).

This summary describes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In general, this disclosure describes image processing techniques involving digital cameras having image sensors and image signal processors (ISPs). The image signal processor may be configured to control the capture of image frames from one or more image sensors and process the image frames from one or more image sensors to generate a view of a scene in a corrected image frame, in which temporal filtering may be applied to blend two or more image frames captured from one or more image sensors as part of a process to produce the corrected image frame. In an example, the image signal processor may receive an instruction to capture a sequence of image frames in response to the loading of software, such as a camera application, on the CPU. The image signal processor may be configured to produce a single flow of output frames, based on respective corrected images from the image sensors. The single flow of output frames may include image frames that contain image data from an image sensor that have been corrected, such as by temporal filtering. The corrected image frame may be produced by combining aspects of the temporal filtering of this disclosure with other computational photography techniques such as high dynamic range (HDR) photography or multi-frame noise reduction (MFNR).

After an output frame representing the scene is determined by the image signal processor using the temporal filtering described in various embodiments herein, the view of the scene may be displayed on a device display, saved to a storage device as a picture or a sequence of pictures as a video, transmitted over a network, and/or printed to an output medium. For example, the image signal processor may be configured to obtain input frames of image data (e.g., pixel values) from the different image sensors, and in turn, produce corresponding output frames of image data (e.g., preview display frames, still-image captures, frames for video, etc.). In other examples, the image signal processor may output frames of the image data to various output devices and/or camera modules for further processing, such as for 3A parameter synchronization (e.g., automatic focus (AF), automatic white balance (AWB), and automatic exposure control (AEC)), producing a video file via the output frames, configuring frames for display, configuring frames for storage, transmitting the frames through a network connection, etc. That is, the image signal processor may obtain incoming frames from one or more image sensors, each coupled to one or more camera lenses, and, in turn, may produce and output a flow of output frames to various output destinations. In such examples, the image signal processor may be configured to produce a flow of output frames that may have reduced ghosting or other artifacts due to the improved temporal filtering with pixel resets.

In one aspect of the disclosure, a method for image processing includes receiving a first image frame and a second image frame. The method may continue with determining a third image frame based on the first image frame and the second image frame by applying temporal filtering to combine the first image frame and the second image frame. The temporal filtering may include, for some pixels (e.g., a "first plurality of pixels"), determining a pixel of the third image frame as a combination of a corresponding pixel of the first image frame and the second image frame. The temporal filtering may include, for other pixels (e.g., a "second plurality of pixels"), resetting the temporal filter by determining a pixel of the third image frame based on the first image frame and not based on the second image frame. The reset may eliminate the contribution to the third image frame from previous image frames, and instead the pixel of the third image frame may be based only on the current image frame. This resetting of certain pixels of the third image frame may reduce the presence of ghosts and other artifacts in the third image frame, thereby improving scene integrity, producing a more accurate representation of the scene, and producing a higher quality photograph or video for the user.

In some embodiments, the pixels of the third image frame that are reset are randomly selected for each frame. In some embodiments, the random pixels are weighted based on a confidence level associated with a temporal filtering (TF) decision for the pixel. In some embodiments, the temporal filtering may be an infinite impulse response (IIR) filter in which the second image frame input used for combining in the temporal filter is itself a temporally-filtered image frame based on at least one image frame prior to the first image frame and the second image frame. In some embodiments, the temporal filtering may be a temporal filter operating on more than two image frames, such as a temporal filter that combines a first ("current") image frame with a first previous image frame and a second previous image frame. The resetting of a temporal filter combining more than two input image frames may involve basing the output image frame on the current image frame and not basing the output image frame on at least one of the previous image frames or all of the previous image frames.

In some aspects, the method may be performed for HDR photography in which the first image frame and the second image frame are captured using different exposure times, different apertures, different lenses, or other different characteristics that may result in improved dynamic range of a fused image when the two image frames are combined. In some aspects, the method may be performed for MFNR photography in which the first image frame and the second image frame are captured using the same or different exposure times.

In an additional aspect of the disclosure, an apparatus is disclosed that includes at least one processor, and a memory coupled to the at least one processor. The at least one processor is configured to perform any of the methods or techniques described herein. For example, the at least one processor may be configured to perform steps including receiving a first image frame and a second image frame. The at least one processor may also be configured to determine a third image frame based on the first image frame and the second image frame by applying temporal filtering to combine the first image frame and the second image frame. The temporal filtering may include, for some pixels (e.g., a "first plurality of pixels"), determining a pixel of the third image frame as a combination of a corresponding pixel of the first image frame and the second image frame. The temporal filtering may include, for other pixels (e.g., a "second plurality of pixels"), resetting the temporal filter by determining a pixel of the third image frame based on the first image frame and not based on the second image frame. The reset may eliminate the contribution to the third image frame from previous image frames, and instead the pixel of the third image frame may be based only on the current image frame. This resetting of certain pixels of the third image frame may reduce the presence of ghosts and other artifacts in the third image frame, thereby improving scene integrity, producing a more accurate representation of the scene, and producing a higher quality photograph or video for the user.

The at least one processor may include an image signal processor or a processor including specific functionality for camera controls and/or processing, such as enabling or disabling the temporal filtering and/or motion compensation. The at least one processor may also or alternatively include an application processor. The methods and techniques described herein may be entirely performed by the image signal processor or the application processor, or various operations may be split between the image signal processor and the application processor, and in some aspects split across additional processors.

The apparatus may include one, two, or more image sensors, such as including a first image sensor. When multiple image sensors are present, the first image sensor may have a larger field of view (FOV) than the second image sensor or the first image sensor may have different sensitivity or different dynamic range than the second image sensor. In one example, the first image sensor may be a wide-angle image sensor, and the second image sensor may be a tele image sensor. In another example, the first sensor is configured to obtain an image through a first lens with a first optical axis and the second sensor is configured to obtain an image through a second lens with a second optical axis different from the first optical axis. Additionally or alternatively, the first lens may have a first magnification, and the second lens may have a second magnification different from the first magnification. This configuration may occur with a lens cluster on a mobile device, such as where multiple image sensors and associated lenses are located in offset locations on a frontside or a backside of the mobile device. Additional image sensors may be included with larger, smaller, or same field of views. The image correction techniques described herein may be applied to image frames captured from any of the image sensors in a multi-sensor device.

In an additional aspect of the disclosure, a device configured for image processing and/or image capture is disclosed. The apparatus includes means for capturing image frames. The apparatus further includes one or more means for capturing data representative of a scene, such as image sensors (including charge-coupled devices (CCDs), Bayer-filter sensors, infrared (IR) detectors, ultraviolet (UV) detectors, complimentary metal-oxide-semiconductor (CMOS) sensors), time of flight detectors. The apparatus may further include one or more means for accumulating and/or focusing light rays into the one or more image sensors (including simple lenses, compound lenses, spherical lenses, and non-spherical lenses). These components may be controlled to capture the first and/or second image frames input to the image processing techniques described herein.

In an additional aspect of the disclosure, a non-transitory computer-readable medium stores instructions that, when executed by a processor, cause the processor to perform operations including those described in the method and techniques described herein. For example, the operations may include receiving a first image frame and a second image frame. The operations may also include determining a third image frame based on the first image frame and the second image frame by applying temporal filtering to combine the first image frame and the second image frame. The temporal filtering may include, for some pixels (e.g., a "first plurality of pixels"), determining a pixel of the third image frame as a combination of a corresponding pixel of the first image frame and the second image frame. The temporal filtering may include, for other pixels (e.g., a "second plurality of pixels"), resetting the temporal filter by determining a pixel of the third image frame based on the first image frame and not based on the second image frame. The reset may eliminate the contribution to the third image frame from previous image frames, and instead the pixel of the third image frame may be based only on the current image frame. This resetting of certain pixels of the third image frame may reduce the presence of ghosts and other artifacts in the third image frame, thereby improving scene integrity, producing a more accurate representation of the scene, and producing a higher quality photograph or video for the user.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

The method may be embedded in a computer-readable medium as computer program code comprising instructions that cause a processor to perform the steps of the method. In some embodiments, the processor may be part of a mobile device including a first network adaptor configured to transmit data, such as images or videos in as a recording or as streaming data, over a first network connection of a plurality of network connections; and a processor coupled to the first network adaptor, and the memory. The processor may cause the transmission of temporally-filtered image frames described herein over a wireless communications network such as a 5G NR communication network.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
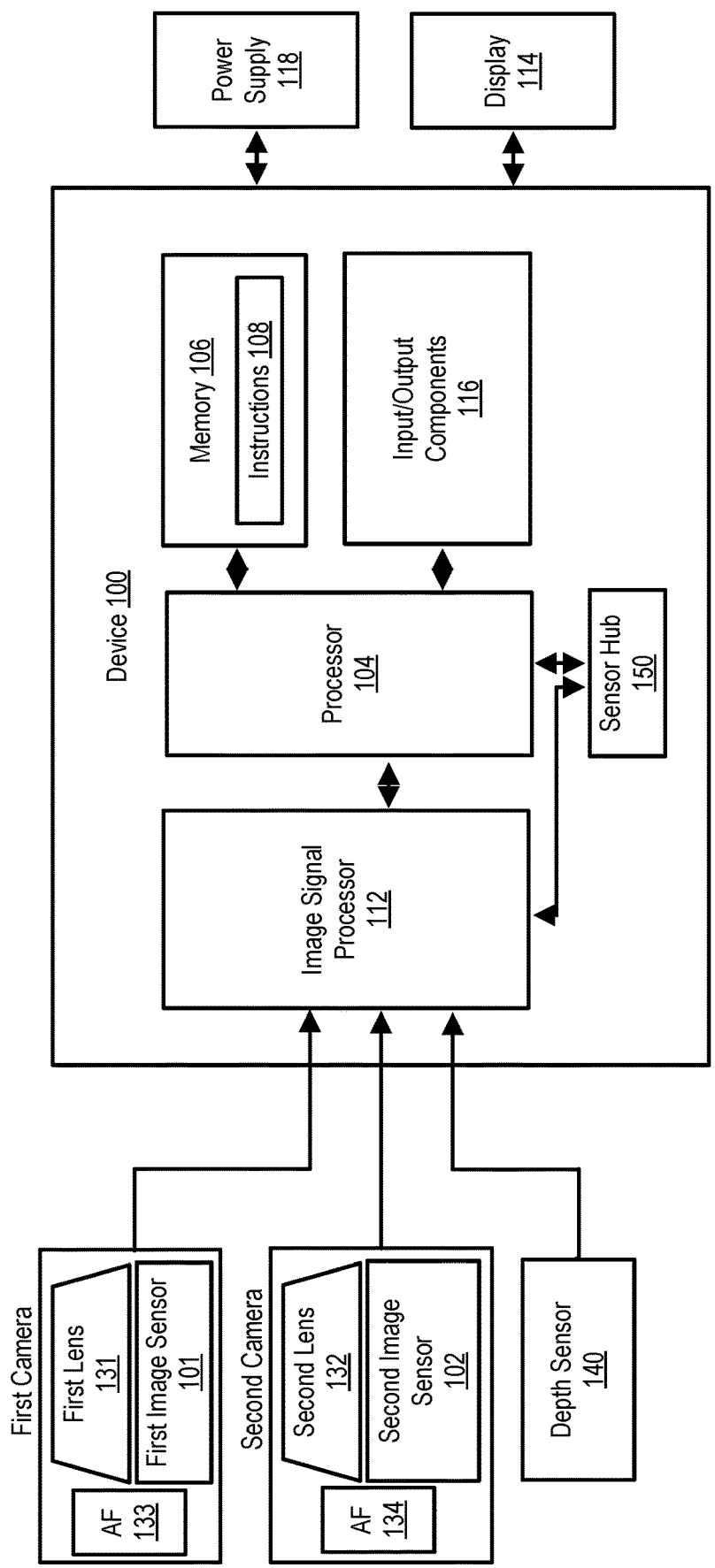
FIG. 1 is a block diagram of a computing device configured to perform one or more of the example techniques described in embodiments this disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support image processing of captured image frames for photography and video, and in particular the temporal filtering of image frames to reduce ghosting and improve the integrity of scene in its representation in the image frame. Particular implementations of the subject matter described in this disclosure may be implemented to realize potential advantages or benefits, such as improved image quality by reducing artifacts in sequences of image frames obtained in, for example, low light scenes. The systems, apparatus, methods, and computer-readable media may be embedded in image capture devices, such as mobile phones, tablet computing devices, laptop computing devices, other computing devices, or digital cameras.

An example device for capturing image frames using one or more image sensors, such as a smartphone, may include a configuration of two, three, four, or more cameras on a backside (e.g., a side opposite a user display) or a front side (e.g., a same side as a user display) of the device. Devices with multiple image sensors include one or more image signal processors (ISPs), Computer Vision Processors (CVPs), or other suitable circuitry for processing images captured by the image sensors. The one or more image signal processors may provide processed image frames to a memory and/or a processor (such as an application processor, an image front end (IFE), an image processing engine (IPE), or other suitable processing circuitry) for further processing, such as for encoding, storage, transmission, or other manipulation.

As used herein, image sensor may refer to the image sensor itself and any certain other components coupled to the image sensor used to generate an image frame for processing by the image signal processor or other logic circuitry or storage in memory, whether a short-term buffer or longer-term non-volatile memory. For example, an image sensor may include other components of a camera, including a shutter, buffer, or other readout circuitry for accessing individual pixels of an image sensor. The image sensor may further refer to an analog front end or other circuitry for converting analog signals to digital representations for the image frame that are provided to digital circuitry coupled to the image sensor.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Aspects of the present disclosure are applicable to any suitable electronic device including or coupled to two or more image sensors capable of capturing image frames (or "frames"). Further, aspects of the present disclosure may be implemented in devices having or coupled to image sensors of the same or different capabilities and characteristics (such as resolution, shutter speed, sensor type, and so on). Further, aspects of the present disclosure may be implemented in devices for processing image frames, whether or not the device includes or is coupled to the image sensors, such as processing devices that may retrieve stored images for processing, including processing devices present in a cloud computing system.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the below description and examples use the term "device" to describe various aspects of the disclosure, the term "device" is not limited to a specific configuration, type, or number of objects. As used herein, an apparatus may include a device or a portion of the device for performing the described operations.

FIG. 1 shows a block diagram of an example device 100 for performing image capture from one or more image sensors. The device 100 may include, or otherwise be coupled to, an image signal processor 112 for processing image frames from one or more image sensors, such as a first image sensor 101, a second image sensor 102, and a depth sensor 140. In some implementations, the device 100 also includes or is coupled to a processor 104 and a memory 106 storing instructions 108. The device 100 may also include or be coupled to a display 114 and a number of input/output (I/O) components 116, such as a touch screen interface and/or physical buttons. The device 100 may further include or be coupled to a power supply 118 for the device 100, such as a battery or a component to couple the device 100 to an energy source. The device 100 may also include or be coupled to additional features or components that are not shown in FIG. 1. In one example, a wireless interface, which may include a number of transceivers and a baseband processor, may be included for a wireless communication device. In a further example, an analog front end (AFE) to convert analog image frame data to digital image frame data may be coupled between the image sensors 101 and 102 and the image signal processor 112.

The device may include or be coupled to a sensor hub 150 for interfacing with sensors to receive data regarding movement of the device 100, data regarding an environment around the device 100, and/or other non-camera sensor data. Such non-camera sensors may be integrated in the device 100 in some embodiments. One example non-camera sensor is a gyroscope, a device configured for measuring rotation, orientation, and/or angular velocity to generate motion data. Another example non-camera sensor is an accelerometer, a device configured for measuring acceleration, which may also be used to determine velocity and distance traveled by appropriately integrating the measured acceleration, and one or more of the acceleration, velocity, and or distance may be included in generated motion data. In some aspects, a gyroscope in an electronic image stabilization system (EIS) may be coupled to the sensor hub or coupled directly to the image signal processor 112. In another example, a non-camera sensor may be a global positioning system (GPS) receiver.

The image signal processor 112 may receive image data, such as used to form image frames. In one embodiment, a local bus connection couples the image signal processor 112 to image sensors 101 and 102 of a first and second camera, respectively. In another embodiment, a wire interface couples the image signal processor 112 to an external image sensor. In a further embodiment, a wireless interface couples the image signal processor 112 to the image sensor 101, 102.

The first camera may include the first image sensor 101 and a corresponding first lens 131. The second camera may include the second image sensor 102 and a corresponding second lens 132. Each of the lenses 131 and 132 may have associated autofocus (AF) systems 133 and 134, respectively, which adjust the lenses 131 and 132 to focus on a particular focal plane at a certain scene depth from the image sensors 101 and 102. The AF systems 133 and 134 may be assisted by depth sensor 140. The focus depth of the AF systems 133 and 134 may provide depth information regarding the image scene to other components of the device 100, such as the ISP 112, through metadata associated with the image frames captured by the image sensors 101 and 102. The device 100 may perform image processing on the image data from a combination of image sensors located within the device 100 or separate from the device 100.

The first image sensor 101 and the second image sensor 102 are configured to capture one or more image frames. Lenses 131 and 132 focus light at the image sensors 101 and 102, respectively, through one or more apertures for receiving light, one or more shutters for blocking light when outside an exposure window, one or more color filter arrays (CFAs) for filtering light outside of specific frequency ranges, one or more analog front ends for converting analog measurements to digital information, and/or other suitable components for imaging. The first lens 131 and second lens 132 may have different field of views to capture different representations of a scene. For example, the first lens 131 may be an ultra-wide (UW) lens and the second lens 132 may be a wide (W) lens. The multiple image sensors may include a combination of ultra-wide (high field-of-view (FOV)), wide, tele, and ultra-tele (low FOV) sensors. That is, each image sensor may be configured through hardware configuration and/or software settings to obtain different, but overlapping, field of views. In one configuration, the image sensors are configured with different lenses with different magnification ratios that result in different fields of view. The sensors may be configured such that a UW sensor has a larger FOV than a W sensor, which has a larger FOV than a T sensor, which has a larger FOV than a UT sensor. For example, a sensor configured for wide FOV may capture fields of view in the range of 64-84 degrees, a sensor configured for ultra-side FOV may capture fields of view in the range of 100-140 degrees, a sensor configured for tele FOV may capture fields of view in the range of 10-30 degrees, and a sensor configured for ultra-tele FOV may capture fields of view in the range of 1-8 degrees.

The image signal processor 112 processes image frames captured by the image sensors 101 and 102. While FIG. 1 illustrates the device 100 as including two image sensors 101 and 102 coupled to the image signal processor 112, any number (e.g., one, two, three, four, five, six, etc.) of image sensors may be coupled to the image signal processor 112. In some aspects, depth sensors such as depth sensor 140 may be coupled to the image signal processor 112 and output from the depth sensors processed in a similar manner to that of image sensors 101 and 102. In addition, any number of additional image sensors or image signal processors may exist for the device 100. In some embodiments, the image signal processor 112 may execute instructions from a memory, such as instructions 108 from the memory 106, instructions stored in a separate memory coupled to or included in the image signal processor 112, or instructions provided by the processor 104. In addition, or in the alternative, the image signal processor 112 may include specific hardware (such as one or more integrated circuits (ICs)) configured to perform one or more operations described in the present disclosure. For example, the image signal processor 112 may include circuitry specifically configured to temporally filter two or more image frames, circuitry specifically configured to implement an infinite impulse response (IIR) filter, and/or circuitry specifically configured to apply motion compensation to an image frame.

In some implementations, the memory 106 may include a non-transient or non-transitory computer readable medium storing computer-executable instructions 108 to perform all or a portion of one or more operations described in this disclosure. In some implementations, the instructions 108 include a camera application (or other suitable application) to be executed by the device 100 for generating images or videos. The instructions 108 may also include other applications or programs executed by the device 100, such as an operating system and specific applications other than for image or video generation. Execution of the camera application, such as by the processor 104, may cause the device 100 to generate images using the image sensors 101 and 102 and the image signal processor 112. The memory 106 may also be accessed by the image signal processor 112 to store processed frames or may be accessed by the processor 104 to obtain the processed frames. In some embodiments, the device 100 does not include the memory 106. For example, the device 100 may be a circuit including the image signal processor 112, and the memory may be outside the device 100. The device 100 may be coupled to an external memory and configured to access the memory for writing output frames for display or long-term storage. In some embodiments, the device 100 is a system on chip (SoC) that incorporates the image signal processor 112, the processor 104, the sensor hub 150, the memory 106, and input/output components 116 into a single package.

In some embodiments, at least one of the image signal processor 112 or the processor 104 executes instructions to perform various operations described herein, including the combining operations of temporal filtering. For example, execution of the instructions can instruct the image signal processor 112 to begin or end capturing an image frame or a sequence of image frames, in which the capture includes temporal filtering as described in embodiments herein. In some embodiments, the processor 104 may include one or more general-purpose processors capable of executing scripts or instructions of one or more software programs, such as instructions 108 stored within the memory 106. For example, the processor 104 may include one or more application processors configured to execute the camera application (or other suitable application for generating images or video) stored in the memory 106. In executing the camera application, the processor 104 may be configured to instruct the image signal processor 112 to perform one or more operations with reference to the image sensors 101 or 102. For example, the camera application may receive a capture command upon which a video comprising a sequence of image frames is captured and processed. Temporal filtering may be applied to one or more image frames in the sequence. The camera application may allow enabling and disabling the temporal filtering and/or configuring parameters of the temporal filtering, such as a number of image frames for combining in the temporal filtering, parameters for determining the application of temporal filtering, and/or an absolute or relative number of random resets to perform per image frame. Execution of instructions 108 outside of the camera application by the processor 104 may also cause the device 100 to perform any number of functions or operations. In some embodiments, the processor 104 may include ICs or other hardware in addition to the ability to execute software to cause the device 100 to perform a number of functions or operations, such as the operations described herein. In some other embodiments, the device 100 does not include the processor 104, such as when all of the described functionality is configured in the image signal processor 112.

In some embodiments, the display 114 may include one or more suitable displays or screens allowing for user interaction and/or to present items to the user, such as a preview of the image frames being captured by the image sensors 101 and 102. In some embodiments, the display 114 is a touch-sensitive display. The I/O components 116 may be or include any suitable mechanism, interface, or device to receive input (such as commands) from the user and to provide output to the user through the display 114. For example, the I/O components 116 may include (but are not limited to) a graphical user interface (GUI), a keyboard, a mouse, a microphone, speakers, a squeezable bezel, one or more buttons (such as a power button), a slider, a switch, and so on.

While shown to be coupled to each other via the processor 104, components (such as the processor 104, the memory 106, the image signal processor 112, the display 114, and the I/O components 116) may be coupled to each another in other various arrangements, such as via one or more local buses, which are not shown for simplicity. While the image signal processor 112 is illustrated as separate from the processor 104, the image signal processor 112 may be a core of a processor 104 that is an application processor unit (APU), included in a system on chip (SoC), or otherwise included with the processor 104. While the device 100 is referred to in the examples herein for performing aspects of the present disclosure, some device components may not be shown in FIG. 1 to prevent obscuring aspects of the present disclosure. Additionally, other components, numbers of components, or combinations of components may be included in a suitable device for performing aspects of the present disclosure. As such, the present disclosure is not limited to a specific device or configuration of components, including the device 100.

When temporal filtering is enabled, conditions may exist that create artifacts in the output image frame. For example, objects that move or disappear from the scene can remain in the temporally-filtered output for a long time due to the temporally-filtered image being based on previous image frames that included the object. These lingering objects in the display are sometimes referred to as "ghosts" due to the object appearing in the image despite the object having left the scene. Ghosts may also appear under other circumstances such as when temporal filtering low contrast (e.g., SNR<1) images. The effects of ghosting can be more pronounced when more aggressive temporal filtering is applied. Any of these artifacts results in scene integrity issues with the output image frame that reduces the accuracy of the scene representation and decreases the user experience. Shortcomings mentioned here are only representative and are included to highlight problems that the inventors have identified with respect to existing devices and sought to improve upon. Aspects of devices described below may address some or all of the shortcomings as well as others known in the art. Aspects of the improved devices described herein may present other benefits than, and be used in other applications than, those described above.

In one aspect of a device 100, image frames captured from one or more of the image sensors 101 and 102 may be modified, such as with temporal filtering with the reset for certain pixels of the image frame. For example, a first image frame from a first image sensor may be temporally filtered by combining portions of the first image frame with portions of a second image frame received from the first sensor or a different second sensor. Temporal filtering with pixel resetting is described in different embodiments with reference to aspects of FIG. 2, FIG. 3, FIG. 4, FIG. 5, FIG. 6, FIG. 7, and/or FIG. 8.

Figure 2:
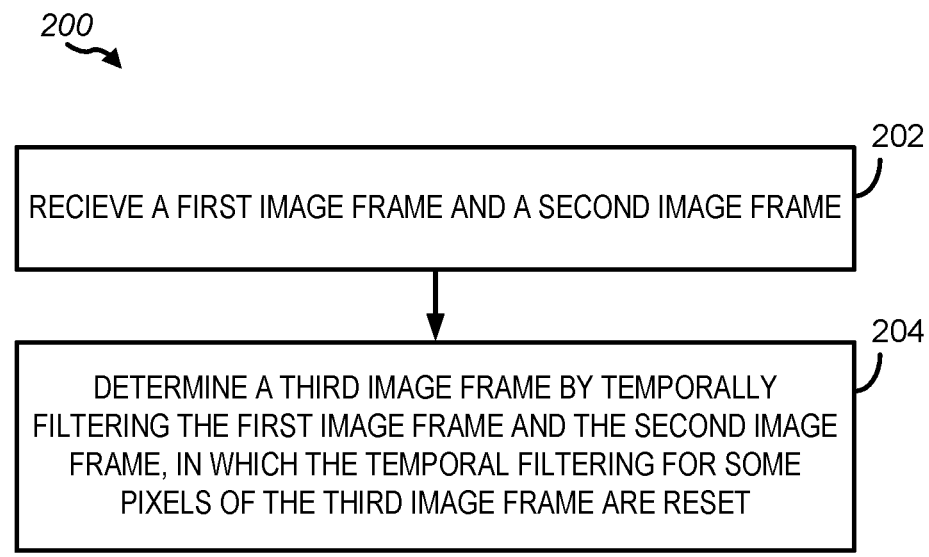
FIG. 2 is a flow chart illustrating a method of temporally filtering image frames with resetting of the temporal filtering according to some embodiments of the disclosure.

FIG. 2 is a flow chart illustrating a method of temporally filtering image frames with resetting of the temporal filtering as described in some embodiments of the disclosure. A method 200 for image processing includes, at block 202, receiving a first image frame and a second image frame. In some embodiments, the first and second image frames may be received from memory. In some embodiments, the first image frame may be received from an image sensor and the second image frame may be received from memory. In some embodiments, the first and second image frame may be received from the same or different image sensors. In some embodiments, the first image frame is an image frame received from a memory or image sensor and the second image frame is an output of the temporal filtering of block 204. Although only a first and a second image frame are described as received at block 202, additional image frames may be received at block 202 and used in the temporal filtering of block 204.

At block 204, the method 200 includes determining a third image frame (the "temporally-filtered" image frame) based on the first image frame and the second image frame by applying temporal filtering to combine the first image frame and the second image frame. The third image frame may be output to memory for storage as a photograph, may be output to memory for use in a sequence of image frames for storage as a video, may be displayed on a display device, may be transmitted to a remote viewer, may be transmitted to a remote storage device, and/or may be transmitted in real-time to a remote display.

The reset of the temporal filtering of block 204 may include performing different processing on pixels of the third image frame. Certain pixels of the third image frame (e.g., "third plurality of pixels") may be determined based on a result of temporal filtering using the first image frame and the second image frame of block 202. These pixels may be all of or a subset of all pixels in the third image frame (e.g., "fourth plurality of pixels"). Some of the third plurality of pixels that are to be determined using temporal filtering may be reset to improve image quality by, for example, reducing ghosting. This splits the third plurality of pixels determined to a first plurality of pixels determined by combining corresponding pixels of the first image frame with the second image frame and to a second plurality of pixels determined based on corresponding pixels of the first image frame without reference to corresponding pixels of the second image frame based on the second plurality of pixels being reset. Corresponding pixels of the first and second image frame may refer to pixels at the same position relative to the image frame or pixels at the same position relative to the scene. The reset of the second plurality of pixels may eliminate or reduce the contribution to the third image frame from previous image frames such as the second image frame. Instead, the second plurality of pixels may be based only on the first (or "current") image frame. This resetting of certain pixels of the third image frame may reduce the presence of ghosts and other artifacts in the third image frame, thereby improving scene integrity. One or more criteria may be used to determine a selection of pixels to be processed as the first plurality of pixels and to determine a selection of pixels to be processed as the second plurality of pixels. These one or more criteria may affect a probability of certain pixels being selected for inclusion in the second plurality of pixels for which the temporal filtering is reset, such that the second plurality of pixels is probabilistically selected. For example, pixels may be determined randomly such that at least a certain percentage or certain number of pixels are reset in each temporally filtered image frame.

Figure 3:
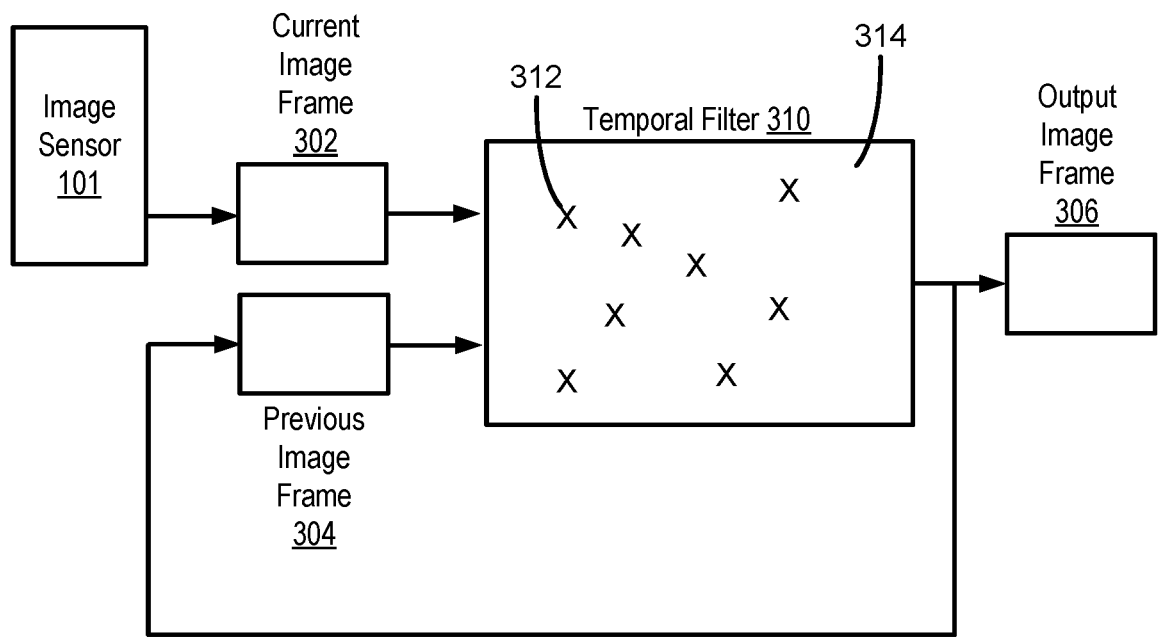
FIG. 3 is a block diagram illustrating an implementation of temporal filtering using an infinite impulse response (IIR) filter with resetting of the filter in some pixels according to some embodiments of the disclosure.

The resetting of some pixels during temporal filtering in some embodiments is illustrated in FIG. 3. FIG. 3 is a block diagram illustrating an implementation of temporal filtering using an infinite impulse response (IIR) filter with resetting of the filter in some pixels according to some embodiments of the disclosure. An image sensor 101 may generate a current image frame 302 that is input to temporal filter 310. The temporal filter 310 also receives a previous image frame 304. The previous image frame 304 may be a feedback from the output of the temporal filter 310 for an infinite impulse response (IIR) filter. The previous image frame 304 may alternatively, in other embodiments of the temporal filter 310, be an image frame captured by the image sensor 101 or another image sensor prior to the capture of the current image frame 302. The temporal filter 310 may determine an output image frame 306 by modifying pixels of the current image frame 302 by combining certain pixels of the current image frame 302 with corresponding pixels of the previous image frame 304.

Some pixels 312 may be reset in the combining of the image frames 302 and 304 in the temporal filter 310 by reducing or eliminating the contribution of image frame 304 to the output image frame 306. For example, the pixels 312 may be randomly selected and reset such that the pixels 312 are based on the corresponding pixels of the image frame 302 without being based on the corresponding pixels of the previous image frame 304. The location of pixels 312 within the output image frame 306 may be randomized within and between output image frames such that the reset pixels change from one output image frame to another output image frame. The location of the random pixels 312 within an output image frame may be weighted based on characteristics of the pixels, regions around the pixels, and/or the image frame as a whole. Likewise, the number of random pixels 312 within an output image frame may vary from one frame to the next based on characteristics of pixels, regions of pixels, the image frame as a whole, or other parameters measured by other sensors of the image capture device. In some embodiments, gyroscope and/or accelerometer data corresponding to an image frame (e.g., collected during the capture of the image frame) may be used to determine a static camera (e.g., a camera mounted on a tripod) and based on the determination decrease probability of resets or decrease the amount of reset pixels in each frame.

Figure 4:
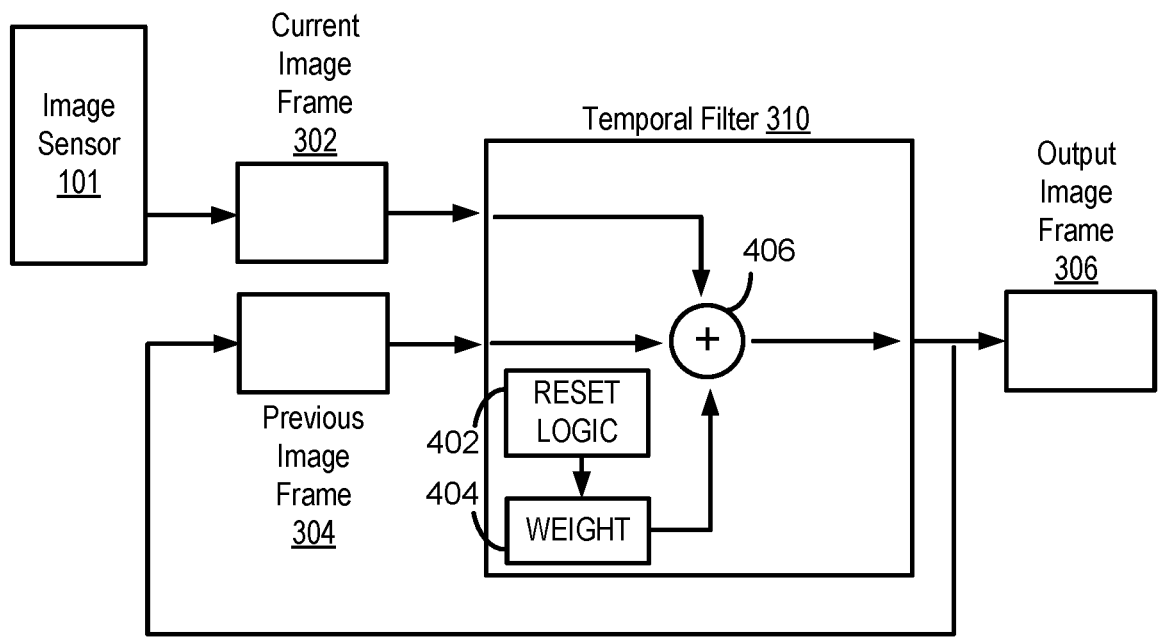
FIG. 4 is a block diagram illustrating an implementation of reset logic for an infinite impulse response (IIR) filter according to some embodiments of the disclosure.

The temporal filter processing involving combining and resetting is described in more detail with reference to FIG. 4. FIG. 4 is a block diagram illustrating an implementation of reset logic for an infinite impulse response (IIR) filter according to some embodiments of the disclosure. The temporal filter 310 receives the current image frame 302 and the previous image frame 304. The temporal filter 310 may modify the current image frame 302 on a pixel-by-pixel basis. A combiner 406 may combine one pixel of the current image frame 302 with a corresponding pixel of the previous image frame 304. The combining may include, for example, averaging the intensity values of the corresponding pixels of the current image frame 302 and the previous image frame 304. The combiner 406 may perform a weighted averaging of the corresponding pixels using a weight value provided by weight block 404. The weight block 404 may determine a weighting of the corresponding pixel in the previous image frame 304 based on a motion factor determined from the spatial movement of a scene from the current image frame 302 to the previous image frame 304. Reset logic 402 may determine certain pixels for resetting and cause the weight block 404 to output a zero weight to the combiner 406 for resetting a pixel, which cancels the contribution of the previous image frame 304 to the output image frame 306 for that pixel. Although pixel-by-pixel operations are described, the operations may alternatively be performed on groups of pixels in the image frame, regions of the image frame, or objects in the image frame.

Figure 5:
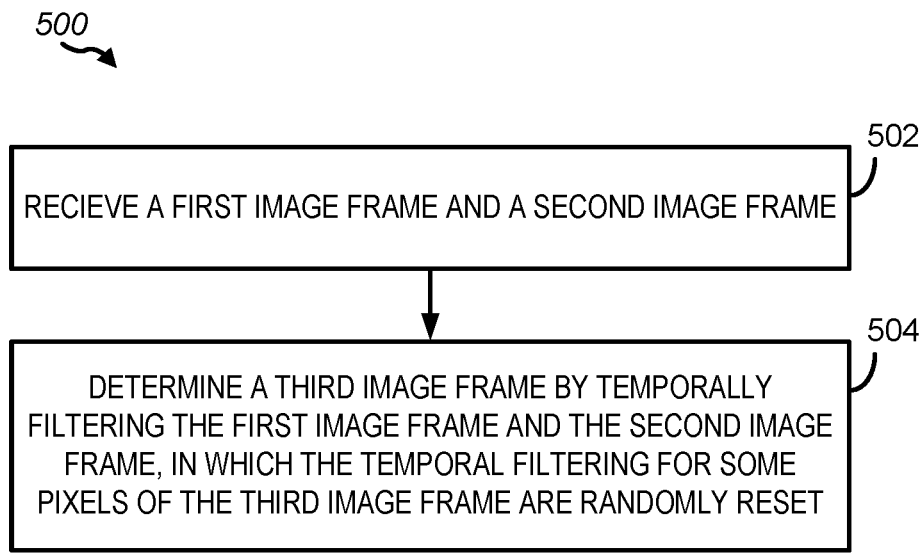
FIG. 5 is a flow chart illustrating a method of temporally filtering image frames with random resetting of the temporal filtering as described in some embodiments of the disclosure.

In one embodiment, the reset logic 402 may randomly select pixels for resetting such that the temporal filter 310 operates according to the method shown in FIG. 5. FIG. 5 is a flow chart illustrating a method of temporally filtering image frames with random resetting of the temporal filtering as described in some embodiments of the disclosure. A method 500 begins at block 502 with receiving a first image frame (e.g., the current image frame 302) and a second image frame (e.g., the previous image frame 304). At block 504, the method 500 includes determining a third image frame by temporally filtering the first image frame and the second image frame, in which the temporal filtering for some pixels of the third image frame are randomly reset. The third image frame determined at block 504 may be displayed to a user and/or stored as a photograph or a frame in a video sequence.

Figure 6:
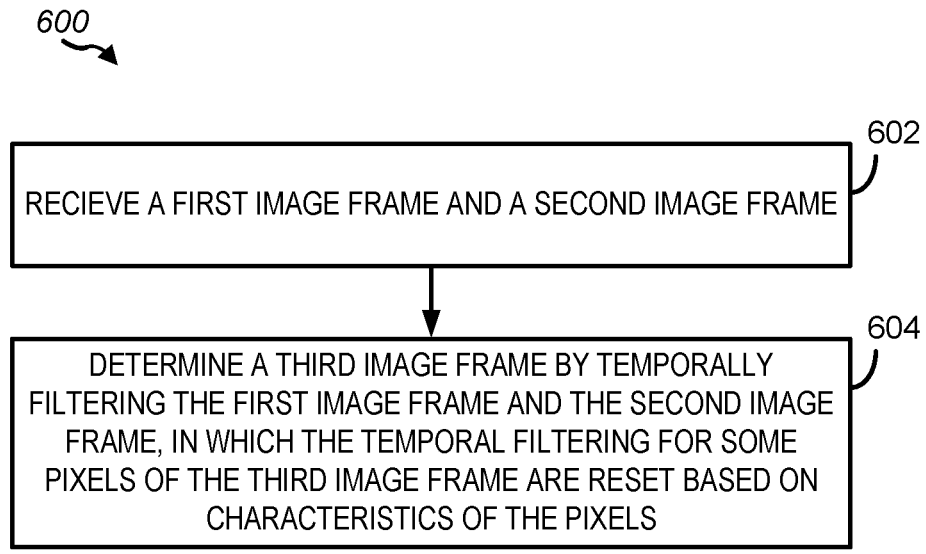
FIG. 6 is a flow chart illustrating a method of temporally filtering image frames with the resetting determined based on characteristics of the pixels according to some embodiments of the disclosure.

In another embodiment, the reset logic 402 may determine particular pixels to reset based on reset weighting values that cause certain pixels to be more likely to be reset than other pixels. The reset weighting values may be determined based on characteristics of the pixel in the image frame, area around the pixel in the image frame, or other characteristics. Certain pixels may be determined, based on these characteristics, to be more beneficial to reset than other pixels based on, for example, whether a corresponding portion of the image frame is static, that is relatively unchanged over time, or dynamic, that is rapidly changing over time. In some embodiments, the random probability for a particular pixel may be reduced to zero to prevent a pixel from being reset or increased to one to force a pixel reset. FIG. 6 is a flow chart illustrating a method of temporally filtering image frames with the resetting determined based on characteristics of the pixels according to some embodiments of the disclosure. A method 600 begins at block 602 with receiving a first image frame and a second image frame. At block 604, a third image frame is determined by temporally filtering the first image frame and the second image frame, in which the temporal filtering for some pixels of the third image frame are reset based on characteristics of the pixels.

One example characteristic of a pixel for adjusting a reset weighting value is whether that pixel is associated with an object. Object detection, such as through an object detection algorithm executing in a computer vision (CV) processor, may be performed on the first or the second image frame to identify objects, such as faces, trees, roads, animals, plants, surfaces, etc. Pixels may be associated with the objects and the reset weighting values for pixels corresponding to the object adjusted together. For example, reset weighting values may be zeroes, to prevent resetting, based on an identification of a static object (e.g., a tree) in pixels corresponding to that region of the image frame. Alternatively or additionally, motion vectors for the pixels may be correlated to identify objects in the image frame. Neighboring pixels with similar motion vectors may be associated such that the reset weighting values for the pixels with similar motion vectors are adjusted together.

A further example characteristic of a pixel for adjusting a reset weighting value is a motion factor associated with the pixel. The motion factor may indicate a spatial difference and/or a temporal difference. For example, a rapidly moving object may have a high temporal difference because the object is in significantly different locations between the first image frame and the second image frame. Objects that are rapidly moving may be more likely to create ghosting or other artifacts, and the reset weighting values for pixels associated with high temporal movement may be randomly reset more often by increasing the reset weighting value. In some embodiments, a motion factor for a pixel may be determined based on a motion vector for the pixel. The magnitude of the motion vector may be used as a motion factor for the pixel, and the reset weighting value corresponding to the pixel adjusted based on the motion vector magnitude.

Another example characteristic of a pixel for the determination of block 604 is the confidence level associated with a temporal filtering decision for the pixel. A decision regarding whether to apply temporal filtering to a certain pixel can be based on a rule with one or more criteria. The temporal filtering decision may be based on determining whether the pixel corresponds to a static region or a dynamic region of the image. A static region may be determined based on whether a temporal difference between image frames is below a certain threshold, which may correspond to an expected temporal noise in the image frame. A confidence level may be determined regarding the temporal filtering decision for a pixel, and that confidence level used to determine, in part, whether to reset a pixel during temporal filtering processing. The confidence level reflects the likelihood of the determination of the pixel being static or dynamic being correct, or more generically the likelihood of the determination to apply or not apply the temporal filter is correct. The confidence level may be determined based on the signal-to-noise ratio (SNR) and local contrast in the region of the pixel. For example, a high local contrast indicating neighboring pixels are very different indicates a strong texture that is unlikely to be noise in the image frame. A high confidence level may be set for pixels with a combination of high spatial difference and low temporal difference. A low confidence level may be set for pixels with low spatial different and high temporal difference.

For a pixel in which a confidence level is high regarding a temporal filtering decision, the rate of pixel resets may be reduced, or no resets performed. In some embodiments, the rate of pixel resets can be adjusted proportionally with the confidence level. For example, no pixel resets may be performed in a region in which a confidence level for pixels in the region is above a high threshold, while a low rate of resets (e.g., 1 in 20 pixels) may be performed in a region in which a confidence level for pixels in the region is above a middle threshold and a normal rate of resets (e.g., 1 in 10 pixels) may be performed in a region in which a confidence level is below the middle threshold. The confidence level of a temporal filtering decision may be based on one or more criteria. For example, a high confidence level may be associated with having a sufficiently high signal-to-noise ratio (SNR) in a region of the image. In another example, a high confidence level may be associated with detecting a presence of a strong texture in a region of the image and, at the same time, a low temporal difference between the pixel in the image frames being input to the temporal filter. Other factors for determining the confidence level include a brightness, a spatial difference, and/or a temporal difference.

The resetting of pixels may be based on reset weighting values, in which the likelihood of any particular pixel being randomly reset is based on a weighting for the particular pixel. A reset weighting map may be determined for each image frame modified by the temporal filter, and the weighting map applied during the determination of random pixels for resetting. Such a reset weighting map may include an array of values ranging from zero to one corresponding to each pixel, in which zero represents no chance of reset for the corresponding pixel and in which one represents a guaranteed reset for the corresponding pixel. The reset weighting map may be initialized with equal values, such as a value of 0.50, for all pixels, such that each pixel is equally likely to be randomly reset by the temporal filter. The reset weighting map may be used in combination with other parameters such that a random function executed for each pixel of an image frame results in a desired average number of pixels being reset in an image frame. An example reset weighting map is shown in FIG. 7.

Figure 7:
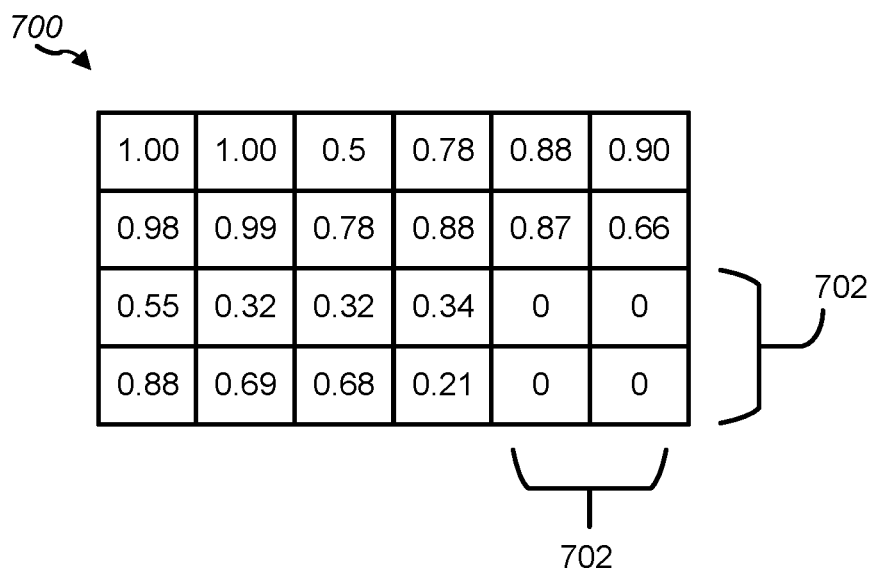
FIG. 7 is a block diagram illustrating weights for pixels of an image frame for the random resetting of a temporal filter according to some embodiments of the disclosure.

FIG. 7 is a block diagram illustrating weights for pixels of an image frame for the random resetting of a temporal filter according to some embodiments of the disclosure. A table 700 includes reset weighting values to modify the probability of certain pixels within an input image frame being reset during application of temporal filtering. In some embodiments, the table 700 may have a 1:1 correlation between values and pixels of the image frame, such that the table 700 is the same in dimensions as the resolution of the input image. When a pixel is reset, the value of the table 700 corresponding to the pixel may be reduced to prevent the pixel from being reset too often. In some embodiments, the table 700 may have a N:1 correlation between values and the pixels of the image frame, such that the table 700 is smaller than the resolution of the input image. A region 702 with zero values may correspond to a detected object that is static in nature, such that temporal filtering resets are not performed for pixels associated with the detected object.

Figure 8:
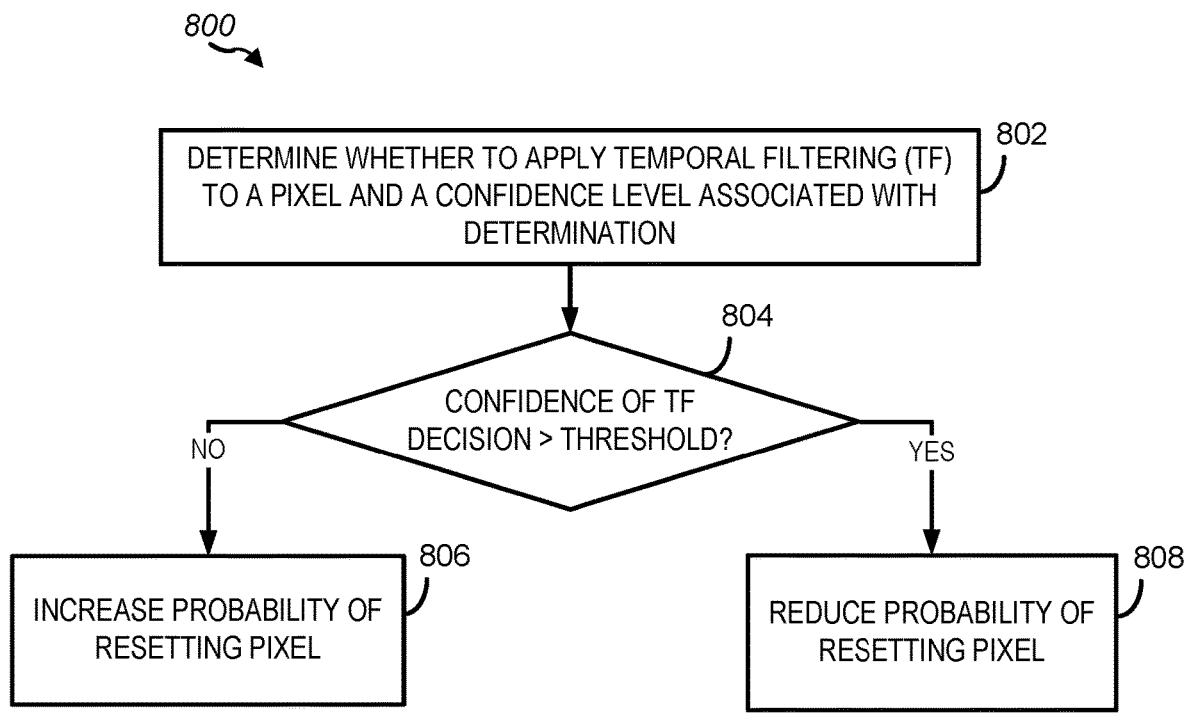
FIG. 8 is a flow chart illustrating a method of determining a probability for resetting temporal filtering for a pixel of an image frame based on a confidence level according to some embodiments of the disclosure.

FIG. 8 is a flow chart illustrating a method of determining reset weighting values for a pixel of an image frame based on a confidence level according to some embodiments of the disclosure. A method 800 begins at block 802 with determining whether to apply temporal filtering (TF) to a pixel. A confidence level may be associated with the TF decision. If the confidence level for the TF decision is greater than a threshold at block 804, the method 800 continues to set a low probability of resetting the pixel corresponding to the TF decision at block 808. If the confidence level for the TF decision is less than a threshold at block 804, the method 800 continues to set a high probability of resetting the pixel corresponding to the TF decision at block 806. For example, block 806 may set certain pixels to have a reset probability of 0.7 (a first probability value), whereas block 808 may set certain pixels to have a reset probability of 0.3 (a second probability value). In some embodiments, the probabilities value for a pixel may be modified based on other factors, such as whether the pixel was reset in one of N previous frames or how many times the pixel was reset in M previous frames. Additionally or alternatively, the probability value may be increased or decreased over time by basing the reset weighting map for a future (e.g., next) image frame based on the reset weighting map for a current or previous image frame. The method 800 may be applied to pixels of an image frame to generate a reset weighting map, such as shown in FIG. 7, and applied during the temporal filtering method of FIG. 6.

Figure 9:
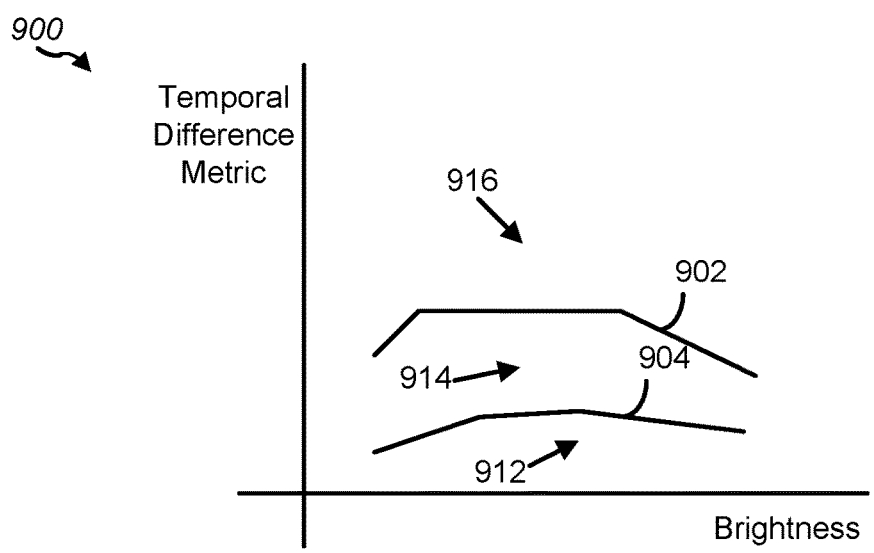
FIG. 9 is a graph illustrating a method of determining a probability for resetting temporal filtering for a pixel of an image frame based on a temporal different metric according to some embodiments of the disclosure.

The determination of a pixel reset in the temporal filtering of FIG. 6 may also be based on other characteristics. FIG. 9 is a graph illustrating a method of determining a probability for resetting temporal filtering for a pixel of an image frame based on a temporal difference metric according to some embodiments of the disclosure. A graph 900 illustrates temporal difference metric values on the y-axis against brightness values on the x-axis. The temporal difference metric reflects a difference in value for a pixel and/or a region around the pixel from one image frame to the next image frame, or another value that reflects the dynamicity, or rate of change, of the pixel's value over time. More dynamic pixels are more likely to create artifacts and may be reset more often, such as by having higher reset weighting values, to improve the quality of the temporal filtering. The temporal difference metric and brightness values for a pixel may fall above a first threshold 902, below the first threshold 902 but above the second threshold 904, or below the second threshold 904. The relation of the pixel's characteristics to the thresholds 902 and 904 may be used to adjust a reset weighting map such as shown in FIG. 7. A pixel that has characteristic values above the first threshold 902 in the x-y space of the graph 900 may be set to be reset frequently, such as by increasing the reset weighting values perhaps as high as one. A pixel that has characteristic values below the second threshold 904 may be set to never reset, such as by setting reset weighting values to zero. A pixel that has characteristic values between the thresholds 902 and 904 may have a weighting applied to the combining of image frames in the temporal filter such that pixels closer to the threshold 902 have larger contributions from the current image frame than the previous image frame.

In one or more aspects, techniques for enhancing image processing, such as any single aspect or any combination of aspects described below or in connection with one or more other processes or devices described elsewhere herein. In one or more aspects, image processing may include performing a method including receiving a first image frame and a second image frame that is temporally prior to the first image frame. The method may also include determining a third image frame based on the first image frame and the second image frame. The method may further include determining to apply temporal filtering to a first plurality of pixels and to a second plurality of pixels within a third plurality of pixels of the third image frame. The method may also include determining the first plurality of pixels using temporal filtering by combining corresponding pixels of the first image frame with the second image frame. The method may further include determining the second plurality of pixels based on corresponding pixels of the first image frame without reference to corresponding pixels of the second image frame. In some implementations, the second plurality of pixels are randomly selected pixels of the third plurality of pixels. Additionally, the method may be performed by an apparatus including a wireless device, such as a user equipment (UE). In some implementations, the apparatus may include at least one processor, and a memory coupled to the processor. The processor may be configured to perform operations described herein with respect to the apparatus. In some other implementations, the method may be embedded in a non-transitory computer-readable medium in program code recorded thereon and the program code may be executable by a computer for causing the computer to perform operations described herein with reference to the apparatus. In some implementations, the method may be performed by one or more means configured to perform operations described herein. In some implementations, a method of wireless communication may include one or more operations described herein with reference to the apparatus.

In a second aspect, in combination with the first aspect, determining a reset weighting map corresponding to the third image frame for determining the third image frame, wherein the second plurality of pixels are pixels within the third image frame selected based on the reset weighting map.

In a third aspect, in combination with one or more of the first aspect or the second aspect, determining the third image frame may include determining to apply temporal filtering to the first plurality of pixels and to the second plurality of pixels; and/or determining confidence levels associated with the determining to apply temporal filtering, wherein the second plurality of pixels are randomly selected for resetting of temporal filtering based on the confidence levels.

In a fourth aspect, in combination with one or more of the first through third aspects, the method may include determining motion factors corresponding to spatial movement of pixels in the first image frame from the second image frame to the first image frame, wherein the reset weighting map is based on the motion factors.

In a fifth aspect, in combination with one or more of the first through fourth aspects, the determining the motion factors comprises determining motion vectors between the second image frame and the first image frame, wherein the reset weighting map is based on magnitudes of the motion vectors.

In a sixth aspect, in combination with one or more of the first through fifth aspects, determining the reset weighting map comprises determining a first location of an object in the first image frame, wherein the reset weighting map is based on the first location of the object.

In a seventh aspect, in combination with one or more of the first through sixth aspects, the second plurality of pixels are randomly selected pixels within the third image frame.

In an eighth aspect, in combination with one or more of the first through seventh aspects, the second image frame comprises a temporally-filtered image frame based on a combination of a fourth image frame and a fifth image frame that are each temporally earlier than the first image frame, such as when the filter is an IIR filter.

In a ninth aspect, in combination with one or more of the first through eighth aspects, the method includes applying motion compensation to the second image frame before determining the third image frame.

In one or more aspects, techniques for supporting a device, including a processor; and a memory coupled to the processor and storing instructions that, when executed by the processor, cause the device to perform operations that may include additional aspects, such as any single aspect or any combination of aspects described below or in connection with one or more other processes or devices described elsewhere herein. In a tenth aspect, supporting image processing may include an apparatus configured for receiving a first image frame and a second image frame that is temporally prior to the first image frame. The apparatus may further be configured for determining a third image frame based on the first image frame and the second image frame. The apparatus may further be configured for determining to apply temporal filtering to a first plurality of pixels and to a second plurality of pixels within a third plurality of pixels of the third image frame; determining the first plurality of pixels using temporal filtering by combining corresponding pixels of the first image frame with the second image frame; and/or determining the second plurality of pixels based on corresponding pixels of the first image frame without reference to corresponding pixels of the second image frame. In some implementations, the second plurality of pixels are randomly selected pixels of the third plurality of pixels. Additionally, the apparatus may perform or operate according to one or more aspects as described below. In some implementations, the apparatus includes a wireless device, such as a user equipment (UE) or base station (BS), or an infrastructure component, such as a cloud-based server. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein.

In an eleventh aspect, in combination with the tenth aspect, the apparatus is configured, such as with instructions, for determining a reset weighting map corresponding to the third image frame for determining the third image frame, wherein the second plurality of pixels are pixels within the third image frame selected based on the reset weighting map.

In a twelfth aspect, in combination with one or more of the tenth through the eleventh aspects, determining the third image frame further comprises: determining to apply temporal filtering to the first plurality of pixels and to the second plurality of pixels; and/or determining confidence levels associated with the determining to apply temporal filtering, wherein the second plurality of pixels are randomly selected for resetting of temporal filtering based on the confidence levels.

In a thirteenth aspect, in a combination with one or more of the tenth through twelfth aspects, the apparatus is configured, such as with instructions, for determining motion factors corresponding to spatial movement of pixels in the first image frame from the second image frame to the first image frame, wherein the reset weighting map is based on the motion factors.

In a fourteenth aspect, in a combination with one or more of the tenth through thirteenth aspects, determining the motion factors comprises determining motion vectors between the second image frame and the first image frame, wherein the reset weighting map is based on magnitudes of the motion vectors.

In a fifteenth aspect, in a combination with one or more of the tenth through fourteenth aspects, determining the reset weighting map comprises: determining a first location of an object in the first image frame, wherein the reset weighting map is based on the first location of the object.

In a sixteenth aspect, in a combination with one or more of the tenth through fifteenth aspects, the second plurality of pixels are randomly selected pixels within the third image frame.

In one or more aspects, techniques for supporting a non-transitory computer-readable medium storing instructions that, when executed by a processor of a device, cause the device to perform operations may include additional aspects, such as any single aspect or any combination of aspects described below or in connection with one or more other processes or devices described elsewhere herein. In a seventeenth aspect, supporting image processing may include a non-transitory computer-readable medium storing instructions that, when executed by a processor of a device, cause the device to perform operations including receiving a first image frame and a second image frame that is temporally prior to the first image frame, determining a third image frame based on the first image frame and the second image frame, determining to apply temporal filtering to a first plurality of pixels and to a second plurality of pixels within a third plurality of pixels of the third image frame, determining the first plurality of pixels using temporal filtering by combining corresponding pixels of the first image frame with the second image frame, and/or determining a second plurality of pixels based on corresponding pixels of the first image frame without reference to corresponding pixels of the second image frame. In some implementations, the second plurality of pixels are randomly selected pixels of the third plurality of pixels. Additionally, the instructions cause an apparatus to perform or operate according to one or more aspects as described below. In some implementations, the apparatus includes a wireless device, such as a base station (BS) or user equipment (UE), or includes an infrastructure device, such as a cloud-based server. In some implementations, the apparatus may include at least one processor, and a memory coupled to the processor. In some aspects, the processor is an image signal processor that further includes circuitry configured to perform other image functions described herein. The processor may be configured to perform operations described herein with respect to the apparatus. In some other implementations, the non-transitory computer-readable medium having program code recorded thereon and the program code may be executable by a computer for causing the computer to perform operations described herein with reference to the apparatus.

In an eighteenth aspect, in combination with the seventeenth aspect, the instructions, when executed by the processor, cause the device to perform further operations comprising: determining a reset weighting map corresponding to the third image frame for determining the third image frame, wherein the second plurality of pixels are pixels within the third image frame selected based on the reset weighting map.

In a nineteenth aspect, in combination with one or more of the seventeenth through the eighteenth aspects, determining the third image frame further comprises: determining to apply temporal filtering to the first plurality of pixels and to the second plurality of pixels; and/or determining confidence levels associated with the determining to apply temporal filtering, wherein the second plurality of pixels are randomly selected for resetting of temporal filtering based on the confidence levels.

In a twentieth aspect, in combination with one or more of the seventeenth through the nineteenth aspects, the instructions, when executed by the processor, cause the device to perform further operations comprising determining motion factors corresponding to spatial movement of pixels in the first image frame from the second image frame to the first image frame, wherein the reset weighting map is based on the motion factors.

In a twenty-first aspect, in combination with one or more of the seventeenth through the twentieth aspects, determining the motion factors comprises determining motion vectors between the second image frame and the first image frame, wherein the reset weighting map is based on magnitudes of the motion vectors.

In a twenty-second aspect, in combination with one or more of the seventeenth through the twenty-first aspects, determining the reset weighting map comprises: determining a first location of an object in the first image frame, wherein the reset weighting map is based on the first location of the object.

In a twenty-third aspect, in combination with one or more of the seventeenth through the twenty-second aspects, the second plurality of pixels are randomly selected pixels within the third image frame.

In a twenty-fourth aspect, in combination with one or more of the seventeenth through the twenty-third aspects, the instructions, when executed by the processor, further cause the device to perform operations comprising: applying motion compensation to the first image frame before determining the third image frame.

In one or more aspects, techniques for supporting image capture and image processing may be implemented in or by a device, including a first image sensor configured with a first field of view, a processor coupled to the first image sensor, and a memory coupled to the processor. The processor is configured to perform steps including additional aspects, such as any single aspect or any combination of aspects described below or in connection with one or more other processes or devices described elsewhere herein. In a twenty-fifth aspect, supporting image capture may include a device configured to receive a first image frame captured at a first time and a second image frame captured at a second time. The device is further configured to perform processing including receiving a first image frame and a second image frame that is temporally prior to the first image frame, determining a third image frame based on the first image frame and the second image frame, determining to apply temporal filtering to a first plurality of pixels and to a second plurality of pixels within a third plurality of pixels of the third image frame, determining the first plurality of pixels using temporal filtering by combining corresponding pixels of the first image frame with the second image frame, and/or determining the second plurality of pixels based on corresponding pixels of the first image frame without reference to corresponding pixels of the second image frame. In some implementations, the second plurality of pixels are randomly selected pixels of the third plurality of pixels. Additionally, the device may perform or operate according to one or more aspects as described below. In some implementations, the device includes a wireless device, such as a base station (BS) or user equipment (UE), or an infrastructure device, such as a cloud-based server. In some implementations, the device may include at least one processor, and a memory coupled to the processor, wherein the processor may be configured to perform operations described herein with respect to the device. In some other implementations, the device may include a non-transitory computer-readable medium having program code recorded thereon and the program code may be executable by the device for causing the device to perform operations described herein with reference to the device. In some implementations, the device may include one or more means configured to perform operations described herein.

In a twenty-sixth aspect, in combination with the twenty-fifth aspect, the processor is further configured to perform steps comprising determining a reset weighting map corresponding to the first image frame, wherein the randomly selected pixels within the third image frame are based on the reset weighting map.

In a twenty-seventh aspect, in combination with one or more of the twenty-fifth through the twenty-sixth aspects, determining the third image frame further comprises determining to apply temporal filtering to the first plurality of pixels and to the second plurality of pixels; and/or determining confidence levels associated with the determining to apply temporal filtering, wherein the second plurality of pixels are randomly selected for resetting of temporal filtering based on the confidence level.

In a twenty-eighth aspect, in combination with the twenty-fifth through the twenty-seventh aspects, the processor is further configured to perform steps comprising determining motion factors corresponding to spatial movement of pixels in the first image frame from the second image frame to the first image frame, wherein the reset weighting map is based on the motion factors.

In a twenty-ninth aspect, in combination with the twenty-fifth through the twenty-eighth aspects, the device further comprises a computer vision (CV) processor, wherein determining the reset weighting map comprises: determining, by the CV processor, a first location of an object in the first image frame, wherein the reset weighting map is based on the first location of the object.

In a thirtieth aspect, in combination with the twenty-fifth through the twenty-ninth aspects, wherein the second image frame comprises a temporally-filtered image frame based on a combination of a fourth image frame and a fifth image frame that are each temporally earlier than the first image frame.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIG. 1, FIG. 3, and FIG. 4 include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:
1. A method, comprising:
   receiving a first image frame associated with a first time and a second image frame associated with a second time, wherein the second time is earlier than the first time; and determining a third image frame that includes a first plurality of pixels and a second plurality of pixels, wherein the first plurality of pixels and the second plurality of pixels constitute a third plurality of pixels forming an entirety of the third image frame;

wherein the determining of the third image frame includes:
selecting (a) a first subset of the third plurality of pixels to be generated, with temporal filtering, as the first plurality of pixels and (b) a second subset of the third plurality of pixels to be generated, without temporal filtering, as the second plurality of pixels; and based on the selecting:
using temporal filtering to modify pixels of the first image frame, that correspond to the selected first subset of the third plurality of pixels, based on corresponding pixels of the second image frame, the modified pixels forming the first plurality of pixels; and outputting pixels of the first image frame that correspond to the selected second subset as the second plurality of pixels without any modification, of the pixels of the first image frame that correspond to the selected second subset, that is based on the second image frame.

2. The method of claim 1, further comprising determining a reset weighting map that assigns a respective weight to each of the third plurality of pixels, wherein:
each of the weights of the weighting map corresponds to a respective probability of a respective one of the pixels of the third plurality of pixels will be selected, in the selecting step, to be part of the second subset; and
the selection of respective pixels of the third plurality of pixels to be part of the first subset and the selection of respective pixels of the third plurality of pixels to part of the second subset are performed probabilistically based on the respective weights of the reset weighting map corresponding to the respective pixels.

3. The method of claim 2, further comprising:
determining respective confidence levels associated with determinations to apply temporal filtering to respective ones of the third plurality of pixels, wherein the determining of the reset weighting map is based on the confidence levels.

4. The method of claim 2, further comprising determining motion factors corresponding to spatial movement of pixels in the first image frame from the second image frame to the first image frame, wherein the reset weighting map is based on the motion factors.

5. The method of claim 4, wherein the determining of the motion factors comprises determining motion vectors between the second image frame and the first image frame, wherein the reset weighting map is based on the motion vectors.

6. The method of claim 2, further comprising determining a first location of an object in the first image frame, wherein the reset weighting map is based on the first location of the object.

7. The method of claim 2, wherein the probabilistic selection is performed such that, with a total number of rounds of the selection, each respective one of the pixels of the third plurality of pixels would be selected to be part of the second subset in a respective number of the total number of the rounds that statically corresponds to the respective weight of the weighting map that is assigned to the respective pixel.

8. The method of claim 1, wherein the selection of the first and second subsets of the third plurality of pixels is performed randomly.

9. The method of claim 1, wherein the second image frame is a temporally-filtered image frame that had been generated based on a combination of a fourth image frame and a fifth image frame that are each associated with respective times that are earlier than the first time with which the first image frame is associated.

10. The method of claim 1, further comprising applying motion compensation to the second image frame before the determining of the third image frame.

11. The method of claim 1, wherein respective weightings are assigned to each of the first and second pluralities of pixels, the weightings identifying respective extents of contribution of the second image frame for modifying the first image frame in the determining of the respective one of the first and second pluralities of pixels of the third image frame, and the outputting of the pixels of the first image frame as the second plurality of pixels is performed by assigning a weighting of zero to each of the second plurality of pixels.

12. A device, comprising:
a processor; and
a memory coupled to the processor and storing instructions that, when executed by the processor, cause the device to perform operations comprising:
receiving a first image frame associated with a first time and a second image frame associated with a second time, wherein the second time is earlier than the first time; and
determining a third image frame that includes a first plurality of pixels and to a second plurality of pixels, wherein the first plurality of pixels and the second plurality of pixels constitute a third plurality of pixels forming an entirety of the third image frame;
wherein the determining of the third image frame includes:
selecting (a) a first subset of the third plurality of pixels to be generated, with temporal filtering, as the first plurality of pixels and (b) a second subset of the third plurality of pixels to be generated, without temporal filtering, as the second plurality of pixels; and
based on the selecting:
using temporal filtering to modify pixels of the first image frame, that correspond to the selected first subset of the third plurality of pixels, based on corresponding pixels of the second image frame, the modified pixels forming the first plurality of pixels; and
outputting pixels of the first image frame that correspond to the selected second subset as the second plurality of pixels without any modification, of the pixels of the first image frame that correspond to the selected second subset, that is based on the second image frame.

13. The device of claim 12, wherein the instructions, when executed by the processor, cause the device to perform further operations comprising determining a reset weighting map that assigns a respective weight to each of the third plurality of pixels, wherein:
each of the weights of the weighting map corresponds to a respective probability of a respective one of the pixels of the third plurality of pixels will be selected, in the selecting step, to be part of the second subset; and
the selection of respective pixels of the third plurality of pixels to be part of the first subset and the selection of respective pixels of the third plurality of pixels to part of the second subset are performed probabilistically based on the respective weights of the reset weighting map corresponding to the respective pixels.

14. The device of claim 13, wherein:
the operations further comprise determining respective confidence levels associated with determinations to apply temporal filtering to respective ones of the third plurality of pixels; and
the determining of the reset weighting map is based on the confidence levels.

15. The device of claim 13, wherein the instructions, when executed by the processor, cause the device to perform further operations comprising determining motion factors corresponding to spatial movement of pixels in the first image frame from the second image frame to the first image frame, wherein the reset weighting map is based on the motion factors.

16. The device of claim 15, wherein the determining of the motion factors comprises determining motion vectors between the second image frame and the first image frame, wherein the reset weighting map is based on the motion vectors.

17. The device of claim 13, wherein:
the instructions, when executed by the processor, cause the device to perform a further operation of determining a first location of an object in the first image frame; and
the reset weighting map is based on the first location of the object.

18. The device of claim 12, wherein the selection of the first and second subsets of the third plurality of pixels is performed randomly.

19. A non-transitory computer-readable medium storing instructions that, when executed by a processor of a device, cause the device to perform operations comprising:
receiving a first image frame associated with a first time and a second image frame associated with a second time, wherein the second time is earlier than the first time; and
determining a third image frame that includes a first plurality of pixels and a second plurality of pixels, wherein the first plurality of pixels and the second plurality of pixels constitute a third plurality of pixels forming an entirety of the third image frame;
wherein the determining of the third image frame includes:
selecting (a) a first subset of the third plurality of pixels to be generated, with temporal filtering, as the first plurality of pixels and (b) a second subset of the third plurality of pixels to be generated, without temporal filtering, as the second plurality of pixels; and
based on the selecting:
using temporal filtering to modify pixels of the first image frame, that correspond to the selected first subset of the third plurality of pixels, based on corresponding pixels of the second image frame, the modified pixels forming the first plurality of pixels; and
outputting pixels of the first image frame that correspond to the selected second subset as the second plurality of pixels without any modification, of the pixels of the first image frame that correspond to the selected second subset, that is based on the second image frame.

20. The non-transitory computer-readable medium of claim 19, wherein the instructions, when executed by the processor, cause the device to perform further operations comprising: determining a reset weighting map that assigns a respective weight to each of the third plurality of pixels, wherein:
each of the weights of the weighting map corresponds to a respective probability of a respective one of the pixels of the third plurality of pixels will be selected, in the selecting step, to be part of the second subset; and
the selection of respective pixels of the third plurality of pixels to be part of the first subset and the selection of respective pixels of the third plurality of pixels to part of the second subset are performed probabilistically based on the respective weights of the reset weighting map corresponding to the respective pixels.

21. The non-transitory computer-readable medium of claim 20, wherein:
the operations further comprise determining respective confidence levels associated with determinations to apply temporal filtering to respective ones of the third plurality of pixels; and
the determining of the reset weighting map is based on the confidence levels.

22. The non-transitory computer-readable medium of claim 20, wherein the instructions, when executed by the processor, cause the device to perform further operations comprising determining motion factors corresponding to spatial movement of pixels in the first image frame from the second image frame to the first image frame, wherein the reset weighting map is based on the motion factors.

23. The non-transitory computer-readable medium of claim 22, wherein the determining of the motion factors comprises determining motion vectors between the second image frame and the first image frame, wherein the reset weighting map is based on the motion vectors.

24. The non-transitory computer-readable medium of claim 20, wherein:
the operations further comprise determining a first location of an object in the first image frame; and
the reset weighting map is based on the first location of the object.

25. The non-transitory computer-readable medium of claim 19, wherein the selection of the first and second subsets of the third plurality of pixels is performed randomly.

26. The non-transitory computer-readable medium of claim 19, wherein the instructions, when executed by the processor, further cause the device to perform operations comprising: applying motion compensation to the first image frame before the determining the third image frame.

27. A device, comprising:
a first image sensor;
a processor coupled to the first image sensor; and
a memory coupled to the processor,
wherein:
the processor is configured to perform steps comprising:
receiving a first image frame associated with a first time and a second image frame associated with a second time, wherein the second time is earlier than the first time; and
determining a third image frame that includes a first plurality of pixels and a second plurality of pixels, wherein the first plurality of pixels and the second plurality of pixels constitute a third plurality of pixels forming an entirety of the third image frame; and the determining of the third image frame includes:
    selecting (a) a first subset of the third plurality of pixels to be generated, with temporal filtering, as the first plurality of pixels and (b) a second subset of the third plurality of pixels to be generated, without temporal filtering, as the second plurality of pixels; and
    based on the selecting:
        using temporal filtering to modify pixels of the first image frame, that correspond to the selected first subset of the third plurality of pixels, based on corresponding pixels of the second image frame, the modified pixels forming the first plurality of pixels; and
        outputting pixels of the first image frame that correspond to the selected second subset as the second plurality of pixels without any modification, of the pixels of the first image frame that correspond to the selected second subset, that is based on the second image frame.

28. The device of claim 27, wherein the processor is further configured to perform steps comprising determining a reset weighting map that assigns a respective weight to each of the third plurality of pixels, wherein:
    each of the weights of the weighting map corresponds to a respective probability of a respective one of the pixels of the third plurality of pixels will be selected, in the selecting step, to be part of the second subset; and
    the selection of respective pixels of the third plurality of pixels to be part of the first subset and the selection of respective pixels of the third plurality of pixels to part of the second subset are performed probabilistically based on the respective weights of the reset weighting map corresponding to the respective pixels.

29. The device of claim 28, wherein:
    the processor is further configured to determine respective confidence levels associated with determinations to apply temporal filtering to respective ones of the third plurality of pixels; and
    the determining of the reset weighting map is based on the confidence levels.

30. The device of claim 28, wherein the processor is further configured to perform steps comprising determining motion factors corresponding to spatial movement of pixels in the first image frame from the second image frame to the first image frame, wherein the reset weighting map is based on the motion factors.

31. The device of claim 28, wherein:
    the device further comprises a computer vision (CV) processor;
    the CV processor is configured to determine a first location of an object in the first image frame; and
    the reset weighting map is based on the first location of the object.

32. The device of claim 27, wherein the second image frame is a temporally-filtered image frame that had been generated based on a combination of a fourth image frame and a fifth image frame that are each associated with respective times that are earlier than the first time with which the first image frame is associated.

\* \* \* \* \*